United States Patent Office 2,805,266
Patented Sept. 3, 1957

2,805,266
PROCESS FOR PREPARING AZULENES

Karl Ziegler and Klaus Hafner, Mulheim an der Ruhr, Germany

No Drawing. Application March 6, 1956, Serial No. 569,695

Claims priority, application Germany March 7, 1955

12 Claims. (Cl. 260—666)

This invention relates to a process for the production of azulenes and is an improvement in the invention of our copending application Serial No. 537,574, filed September 29, 1955, now U. S. Patent No. 2,766,304.

The said copending application describes and claims a process for preparing azulenes which comprises subjecting a member of the group consisting of the compounds of the general formula

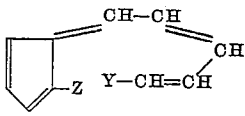

wherein Z stands for hydrogen, Y represents a member of the group consisting of the halogens, the hydroxy-group, the alkoxy-groups and the substituted and unsubstituted amino-groups and the hydrogen atoms otherwise present in the molecule may be substituted by monovalent radicals and of the tautomers of the said compounds to a temperature of about 100–300° C.

Preferably the azulene which is formed is removed as quickly as possible from the reaction chamber. In a preferred embodiment a cyclopentadiene, which is substituted in at least one orthoposition to the CH₂ group by hydrogen, is condensed with a compound of the following general formula:

$$O=CH-CH=CH-CH=CH-Y$$

wherein Y represents a member of the group consisting of the halogens, the hydroxy-group, the alkoxy-groups and the substituted and unsubstituted amino-groups, and the fulvene thus obtained is then heated to an elevated temperature.

It has now been found that azulenes are obtained in a surprisingly simple and technically advantageous manner if a metal compound of a cyclopentadiene which is unsubstituted in at least one o-position to the CH₂-group and which may be substituted in the other positions is reacted with a quaternary pyridinium salt, and the intermediate products initially formed are converted into the corresponding azulenes either directly in a single process or after intermediate isolation.

The course of the chemical reaction has still not been completely explained scientifically. Probably an N-alkyl-1-cyclopentadienyl-dihydropyridine is initially formed as well as the metal halide, and the former is then rearranged to form the corresponding fulvene with cleavage of the pyridine ring. For example, if sodium cyclopentadiene and pyridinium methylbromide are used as starting materials, there are initially formed sodium bromide and probably the N-methyl-1-cyclopentadienyl-dihydropyridine of the following formula

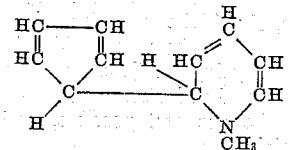

and then the latter is rearranged with cleavage of the pyridine ring to form N-methyl-5-aminopentadiene-(2,4)-yl-fulvene of the following formula

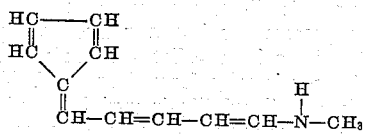

Cyclopentadienes substituted in any desired manner can be used in place of unsubstituted cyclopentadiene as the cyclopentadiene component, but in every case at least two juxtaposed C-atoms must be unsubstituted and no substituents should be present which disturb the systematic course of the reaction. If it is desired to produce final products which contain a carboxylic acid group, it is expedient to use starting components which contain an esterified carboxylic acid group and to split off the ester group after completing the formation of the azulene. Examples of suitable substituents are amino, substituted amino, alkyl, aryl and aralkyl groups. Indene is to be regarded as a substituted cyclopentadiene within the scope of the present invention. It is just as suitable as a starting component as are its substitution products selected as above.

Suitable metal compounds of the cyclopentadienes are the alkali or alkaline-earth compounds. Provided that the operation is carried out in the presence of alkali metal alcoholates, it is also possible to use the free cyclopentadienes instead of the metal compounds of the cyclopentadienes.

Quaternary pyridinium compounds substituted in any desired manner can be used as pyridinium components, but also here it is necessary not to use any substituents which impede the course of the reaction. For example, 2,4-dinitrophenyl-N-pyridinium chloride, which can be prepared from 2,4-dinitrochlorobenzene and pyridine (Th. Zincke, Liebigs Annalen, vol. 333, 1, 1904), can be converted by heating with sodium cyclopentadiene in an inert high-boiling organic solvent, for example dibutyl ether, into the brownish coloured fulvene-like intermediate product, which yields azulene upon being heated with benzidine. Instead of sodium cyclopentadiene, monomeric cyclopentadiene can also be caused to act in the presence of alcoholic potassium on the pyridinium salt in order to obtain the same azulene-forming intermediate product. The reaction can also be conducted in liquid ammonia and proceeds particularly smoothly therein, since sodium cyclopentadiene is soluble in liquid ammonia. Other quaternary salts of pyridine can be subjected to the reaction instead of the 2,4-dinitrophenyl-N-pyridinium chloride, such as quite generally the N-alkyl pyridinium halides, the salts of pyridine and chloroacetic acid, chloroformic acid esters, bromoacetone, chloromethyl ether, chlorosulphonic acid or their esters, and also the N-4-pyridyl-pyridinium chloride hydrochloride obtained from pyridine and thionyl chloride (Koenigs, Greiner, Ber. d. Deutschen Chemischen Gesellschaft, vol. 64, 1049, 1931), or pyridinium-glutaconic dialdehyde-diethylimide-diperchlorate (Schwarzenbach, Weber, Helv. Chim. Acta 25, 1628, 1942). These pyridinium salts, especially the N-alkyl or N-benzyl pyridinium halides, are prepared in a particularly simple manner. The salts, which are usually well crystallised, are obtained in a strongly exothermic reaction when the two components are mixed.

Since the component used for quaternising the pyridine compound is lost during the reaction, it is obvious for economic considerations that the cheapest possible components, such as benzyl chloride or methyl or ethyl chloride or bromide, should be used for this purpose. The same applies as regards the metal which is used for the formation of the cyclopentadiene-metal compound. It is also advisable here that for economic reasons the metals used should be the cheapest possible, such as sodium, potassium or calcium.

In one preferred form of the process according to the present invention, starting with a cyclopentadiene-metal compound and a quaternary pyridinium salt, the corresponding azulene is directly obtained in a single-stage process. The process can however also be carried out with isolation of the intermediate products. The intermediate products primarily formed are probably of the type of 1-cyclopentadienyl-dihydropyridines and are very unstable, being transformed at room temperature into the corresponding fulvenes with splitting off of the dihydropyridine ring. Therefore, if it is desired to isolate the aforementioned intermediate products of the 1-cyclopentadienyl-dihydropyridine type, it is necessary to work under special conditions, for example low temperature and the use of liquid ammonia as solvent. The intermediate products, probably of the fulvene type, are stable and can easily be isolated, so that the process according to the invention can in each case also be carried out in two stages, with isolation of the fulvene intermediate products.

The present process makes it possible for the intermediate products described to be obtained quickly and simply and for the azulenes to be produced in relatively large amounts and in an economically advantageous manner from the said intermediate products.

Example 1

17.2 g. ($\frac{1}{10}$ mol) of N-methyl pyridinium bromide are added at $-35°$ C. to a solution of 10.2 g. ($\frac{1}{10}$ mol) of sodium methyl-cyclopentadiene in 200 cc. of liquid ammonia. The solution becomes yellowish red in colour and a yellow oil is precipitated. The ammonia is slowly evaporated and finally is filtered off in vacuo from the dark-red solid residue which is left. The residue is mixed with three times its weight of benzidine and this mixture is subjected in portions to distillation with steam superheated to 300° C. The distillate is again subjected to steam distillation with saturated steam at 100° C. Azulene distills over. It is taken up in hexane and any benzidine which had distilled over at the same time is washed with dilute hydrochloric acid out of the hexane layer, which is deep blue in colour. After drying the hexane phase, the hexane is distilled off in a column. Pure 1-methyl azulene is obtained in the residue with a yield of 7.9 g. (=55.6% of the theoretical). The blue oil gives a trinitrobenzolate with the melting point of 156° and its spectrum shows, inter alia, strong maxima at 738, 669 and 607 m/$\mu$.

Example 2

1.74 g. ($\frac{1}{100}$ mol) of N-methyl pyridinium bromide are finely triturated under nitrogen with 0.9 g. of sodium cyclopentadiene and 50.0 g. of benzidine. This mixture is heated in a simple distillation apparatus at 250° C. and a gentle current of nitrogen is introduced into the melt. The azulene formed is carried over by the nitrogen together with some benzidine, into a cooled receiver. When no further azulene passes over, the contents of the receiver are dissolved in acetone, the benzidine is converted with dilute hydrochloric acid into its water-soluble hydrochloride and the azulene is taken up in hexane. After drying the hexane phase, the hexane is distilled off in a small column. The crystalline azulene is left with a good yield.

Example 3

23.5 g. ($\frac{1}{10}$ mol) of $\alpha$-methyl-pyridinium methyl bromide are well mixed with 9 g. of sodium cyclopentadiene and 150 g. of benzidine in a nitrogen atmosphere. This mixture is heated at 250–300° C. in a conventional distillation apparatus and a gentle stream of nitrogen is passed through the melt. A blue oil is distilled over, together with a small amount of benzidine. The reaction is completed after about 20 minutes. The contents of the receiver are taken up in hexane and the blue hexane solution is washed with dilute hydrochloric acid. This solution is then dried over calcium chloride and the hexane is distilled off in a small column. A blue oil is left, which is shown to be 4-methyl-azulene. With trinitrobenzene, it yields a molecular compound with the melting point of 177–178° C. (from ethanol). The spectrum in the visible range shows strong maxima at 679, 618 and 567 m/$\mu$.

Example 4

The mixture of 23.5 g. ($\frac{1}{10}$ mol) of $\beta$-methyl-pyridinium methiodide, 9 g. of sodium cyclopentadiene and 150 g. of benzidine are heated under high vacuum at about 300° C. A blue oil distils over together with the benzidine. The distillate is dissolved in acetone and about 50 cc. of hexane are added to this solution. It is then diluted with water, the benzidine is dissolved by adding dilute hydrochloric acid and the deep blue hexane layer is separated. The organic phase is washed with water and dried over calcium chloride. The hexane is then distilled off in a small column and a residue is obtained consisting of a blue oil, which is 5-methyl azulene. Melting point of the trinitrobenzolate: 147° C. (from ethanol). Absorption maxima: 616, 679, 648, 618, 591 m/$\mu$.

Example 5

11.2 g. ($\frac{1}{20}$ mol) of $\gamma$-methyl pyridinium ethyl bromide are added to a solution of 4.4 g. of sodium cyclopentadiene in liquid ammonia at $-40°$ C. A yellowish red oil and sodium bromide are precipitated. The ammonia is then evaporated and the residue is finally heated for a short time at about 50° C. in vacuo for completely removing the ammonia. The residue is then thoroughly mixed with 50 g. of benzidine and this mixture is distilled with steam superheated to 300° C. A blue oil and benzidine are distilled over together with the steam. After the distillate has been worked up as described in Example 4, a bluish-violet crystalline compound is obtained, which is shown to be 6-methyl azulene on the basis of its melting point of 82–83° C. and also its trinitrobenzolate melting point of 140–140.5° C. The spectrum of the 6-methyl azulene obtained in this manner shows inter alia strong maxima at 681, 617 and 668 m/$\mu$.

Example 6

12.4 g. ($\frac{1}{20}$ mol) of 2,4-dimethyl pyridinium methyl bromide are heated under reflux for one hour with 4.4 g. of sodium cyclopentadiene in glycol dimethyl ether. The solution becomes orange-red in colour and a colourless precipitate (sodium bromide is precipitated). The glycol dimethyl ether is then distilled off in vacuo, the oily residue is triturated with 100 g. of benzidine and this mixture is subjected to distillation with steam superheated to 300° C. A bluish-violet oil distils over together with benzidine. The distillate is worked up as described in Example 4 and finally a bluish-violet oil is obtained, which is 4,6-dimethyl azulene. It forms a trinitrobenzolate with the melting point of 143° C. and its spectrum in the visible range shows strong maxima at 660, 602 and 550 m/μ.

*Example 7*

6.2 g. (1/40 mol) of 2,6-dimethyl pyridinium methyl bromide are finely triturated in a nitrogen atmosphere with 2.2 g. of sodium cyclopentadiene and 30 g. of benzidine and this mixture is heated under high vacuum at 300° C. A violet oil distils over together with the benzidine. After completion of the reaction, the contents of the receiver are dissolved in acetone. After adding 50 cc. of hexane, 100 cc. of water are added to the solution and thereafter such an amount of dilute hydrochloric acid that all the benzidine has entered into solution as hydrochloride. The organic phase is separated, washed neutral with dilute soda solution, dried over calcium chloride, and then the hexane is distilled off in a small column. As residue, there are obtained violet needles with the melting point of 69° C. this being 4,8-dimethyl azulene. The trinotrobenzolate melts at 178-179° C. Absorption maxima: 662, 604, 673, 560 m/μ.

*Example 8*

A mixture of 2.2 g. (1/100 mol) of quinolinium methyl bromide, 0.9 g. of sodium cyclopentadiene and 20 g. of benzidine are heated under high vacuum at about 300° C. A blue oil distils over together with the benzidine. The distillate is dissolved in acetone and, after adding hexane, the benzidine is washed out with dilute hydrochloric acid. After the blue hexane phase has been washed neutral, it is dried over calcium chloride and then the hexane is distilled off in a small column. The 4,5-benzazulene which is left forms with trinitrobenzene a molecular compound which has a melting point of 160-161° C.

What we claim is:

1. A method of producing azulenes, comprising the steps of reacting a pyridinium salt with a substance selected from the group consisting of alkali and alkaline earth metal compounds of a cyclopentadiene which is substituted by hydrogen in at least one position adjacent to the CH₂-group in the presence of a solvent so as to form an intermediate reaction product; and subjecting the thus formed intermediate reaction product to a temperature of about 100-300° C. so as to convert said intermediate reaction product to an azulene.

2. A method of producing azulenes, comprising the steps of reacting a pyridinium salt with a sodium compound of a cyclopentadiene which is substituted by hydrogen in at least one position adjacent to the CH₂-group in the presence of a solvent so as to form an intermediate reaction product; and subjecting the thus formed intermediate reaction product to a temperature of about 100-300° C. so as to convert said intermediate reaction product to an azulene.

3. A method of producing azulenes, comprising the steps of reacting a pyridinium salt with a potassium compound of a cyclopentadiene which is substituted by hydrogen in at least one position adjacent to the CH₂-group in the presence of a solvent so as to form an intermediate reaction product; and subjecting the thus formed intermediate reaction product to a temperature of about 100-300° C. so as to convert said intermediate reaction product to an azulene.

4. A method of producing azulenes, comprising the steps of reacting a pyridinium salt with a calcium compound of a cyclopentadiene which is substituted by hydrogen in at least one position adjacent to the CH₂-group in the presence of a solvent so as to form an intermediate reaction product; and subjecting the thus formed intermediate reaction product to a temperature of about 100-300° C. so as to convert said intermediate reaction product to an azulene.

5. A method of producing azulenes, comprising the steps of reacting a pyridinium salt selected from the group consisting of alkyl and aralkyl pyridinium salts with a substance selected from the group consisting of alkali and alkaline earth metal compounds of a cyclopentadiene which is substituted by hydrogen in at least one position adjacent to the CH₂-group in the presence of a solvent so as to form an intermediate reaction product; and subjecting the thus formed intermediate reaction product to a temperature of about 100-300° C. so as to convert said intermediate reaction product to an azulene.

6. A method of producing azulenes, comprising the steps of reacting a pyridinium salt with a solution of a substance selected from the group consisting of alkali and alkaline earth metal compounds of a cyclopentadiene which is substituted by hydrogen in at least one position adjacent to the CH₂-group dissolved in a solvent therefor so as to form an intermediate reaction product; and subjecting the thus formed intermediate reaction product to a temperature of about 100-300° C. so as to convert said intermediate reaction product to an azulene.

7. A method of producing azulenes, comprising the steps of reacting a pyridinium salt with a solution of a substance selected from the group consisting of alkali and alkaline earth metal compounds of a cyclopentadiene which is substituted by hydrogen in at least one position adjacent to the CH₂-group dissolved in liquid ammonia so as to form an intermediate reaction product; and subjecting the thus formed intermediate reaction product to a temperature of about 100-300° C. so as to convert said intermediate reaction product to an azulene.

8. A method of producing azulenes, comprising the steps of reacting a pyridinium salt selected from the group consisting of alkyl and aralkyl pyridinium salts with a solution of a substance selected from the group consisting of alkali and alkaline earth metal compounds of a cyclopentadiene which is substituted by hydrogen in at least one position adjacent to the CH₂-group dissolved in liquid ammonia so as to form an intermediate reaction product; and subjecting the thus formed intermediate reaction product to a temperature of about 100-300° C. so to convert said intermediate reaction product to an azulene.

9. A method of producing azulenes, comprising the steps of reacting a pyridinium salt selected from the group consisting of alkyl and aralkyl pyridinium salts with a solution of a substance selected from the group consisting of alkali and alkaline earth metal compounds of a cyclopentadiene which is substituted by hydrogen in at least one position adjacent to the CH₂-group dissolved in an organic solvent therefor under reflux conditions so as to form an intermediate reaction product; and subjecting the thus formed intermediate reaction product to a temperature of about 100-300° C. so as to convert said intermediate reaction product to an azulene.

10. A method of producing azulenes, comprising the steps of reacting a pyridinium salt selected from the group consisting of alkyl and aralkyl pyridinium salts with a solution of a substance selected from the group consisting of alkali and alkaline earth metal compounds of a cyclopentadiene which is substituted by hydrogen in at least one position adjacent to the CH₂-group dissolved in liquid ammonia in the presence of a high boiling inert solvent of basic character so as to form an intermediate reaction product; and subjecting the thus formed intermediate reaction product to a temperature of about 100-300° C. so as to convert said intermediate reaction product to an azulene.

11. A method of producing azulenes, comprising the steps of reacting a pyridinium salt selected from the group consisting of alkyl and aralkyl pyridinium salts with a solution of a substance selected from the group consisting of alkali and alkaline earth metal compounds of a cyclopentadiene which is substituted by hydrogen in at least one position adjacent to the CH₂-group dissolved in an organic solvent therefor under reflux conditions in the presence of a high boiling inert solvent of basic character so as to form an intermediate reaction product;

and subjecting the thus formed intermediate reaction product to a temperature of about 100–300° C. so as to convert said intermediate reaction product to an azulene.

12. A method of producing azulenes, comprising the step of heating a pyridinium salt selected from the group consisting of alkyl and aralkyl pyridinium salts and a substance selected from the group consisting of alkali and alkaline earth metal compounds of a cyclopentadiene which is substituted by hydrogen in at least one position adjacent to the $CH_2$-group in the presence of a high boiling inert solvent of basic character to a temperature of about 100–300° C.

References Cited in the file of this patent

UNITED STATES PATENTS 2,766,304   Ziegler et al. _____ Oct. 9, 1956

OTHER REFERENCES

Gordon: Chemical Reviews, vol. 50, No. 1 (Feb. 1952), pp. 127–200.